United States Patent
Haas et al.

(10) Patent No.: US 9,274,945 B2
(45) Date of Patent: Mar. 1, 2016

(54) PROCESSING UNIT RECLAIMING REQUESTS IN A SOLID STATE MEMORY DEVICE

(71) Applicant: International Business Machines Corporation, Armonk, NY (US)

(72) Inventors: Robert Haas, Zurich (CH); Roman Pletka, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/707,639

(22) Filed: Dec. 7, 2012

(65) Prior Publication Data

US 2013/0159609 A1    Jun. 20, 2013

(30) Foreign Application Priority Data

Dec. 15, 2011   (EP) .................................... 11193650

(51) Int. Cl.
    *G06F 12/00*    (2006.01)
    *G06F 13/00*    (2006.01)
    *G06F 13/28*    (2006.01)
    *G06F 12/02*    (2006.01)

(52) U.S. Cl.
    CPC ........ *G06F 12/0246* (2013.01); *G06F 12/0253* (2013.01); *G06F 2212/7205* (2013.01); *Y02B 60/1225* (2013.01)

(58) Field of Classification Search
    CPC ............ G06F 12/0253; G06F 12/0246; G06F 12/0238; G06F 12/023; G06F 12/0207; G06F 12/02; G06F 2212/7205; Y02B 60/1225
    USPC .......... 711/103, 173, E12.033, 144, 118, 154, 711/161, 162, 165; 707/813, 817
    See application file for complete search history.

(56) References Cited

U.S. PATENT DOCUMENTS

| | | | |
|---|---|---|---|
| 2005/0066137 A1* | 3/2005 | Jeddeloh et al. | 711/154 |
| 2007/0033376 A1* | 2/2007 | Sinclair et al. | 711/203 |
| 2010/0199019 A1* | 8/2010 | Fisher | 711/103 |
| 2010/0306455 A1* | 12/2010 | Lee | 711/103 |
| 2012/0023144 A1* | 1/2012 | Rub | 707/813 |
| 2013/0138868 A1* | 5/2013 | Seroff et al. | 711/103 |

OTHER PUBLICATIONS

Nitin Agrawal et al., "Design Tradeoffs for SSD Performance", Proceedings of the 2008 USENIX Technical, Conference, 2008.
Junghee Lee et al., "A Semi-Preemptive Garbage Collector for SSDs," Performance Anal. of Syst. & Soft. (ISPASS), IEEE Intern. Symp. Apr. 2011 pp. 12-21 and 10-12.

* cited by examiner

*Primary Examiner* — Sanjiv Shah
*Assistant Examiner* — Shane Woolwine
(74) *Attorney, Agent, or Firm* — Fleit Gibbons Gutman Bongini & Bianco PL; Thomas Grzesik

(57) ABSTRACT

An apparatus and method for processing unit reclaiming requests in a solid state memory device. The present invention provides a method of managing a memory which includes a set of units. The method includes selecting a unit from the set of units having plurality of subunits. The method further includes determining a number of valid subunits m to be relocated from the units selected for a batch operation where m is at least 2. The selecting is carried out by a unit reclaiming process.

16 Claims, 3 Drawing Sheets

PROCESSING UNIT RECLAIMING REQUESTS IN A SOLID STATE MEMORY DEVICE

CROSS-REFERENCE TO RELATED APPLICATION

This application claims priority under 35 U.S.C. §119 from European Patent Application No. 11193650.6 filed on Dec. 15, 2011, the entire contents of which are incorporated herein by reference.

BACKGROUND OF THE INVENTION

1. Field of the Invention

More particularly, the present invention is related to processing unit reclaiming requests in a solid state memory device.

2. Description of Related Art

This application is related to the commonly owned U.S. patent application Ser. No. 13/688,270 entitled "Scheduling Requests in a Solid State Memory Device", the entire contents of which are incorporated herein by reference. Solid state memory devices encompass rewritable non-volatile memory devices which can use electronic circuitry for storing data. Currently, solid state memory devices replace conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance and an appreciated robustness due to lack of moveable parts.

However, writing data to a solid-state memory device such as a flash memory device requires paying attention to specifics in the flash technology. NAND flash memory is organized in pages and blocks. Multiple pages form a block. While read and write operations can be applied to pages as the smallest entity of such operation, erase operations can only be applied to entire blocks. While in other storage technologies outdated data can simply be overwritten by up-to-date data, flash technology requires an erase operation before up-to-date data can be written to an erased block.

In flash technology erase operations take much longer than read or write operations a writing technique called "write out of place" is applied in which new or updated data is written to some free page offered by a free page allocator instead of writing it to the same page where the outdated data resides. The page containing the outdated data is marked as invalid page.

The more data that is written over time, the less free pages can be offered and blocks can need to be reclaimed for a free block queue, for example, a queue for providing free and erased blocks for writing new and updated data to. Free blocks need to be reclaimed from blocks filled with valid and/or invalid data. The block reclaiming process—also known in literature as "garbage collection process"—first identifies blocks for cleaning based on a given policy. Then valid data that still resides in these blocks is relocated and copied to other blocks, and finally the blocks that are now free from valid data are erased and become available again for rewriting. Consequently, the block reclaiming process introduces additional read and write operations as well as erase operations, the extent of which depends on the specific policy deployed as well as on system parameters.

BRIEF SUMMARY OF THE INVENTION

One aspect of the present invention provides a method of managing a memory which includes a set of units. The method includes selecting a unit from the set of units having plurality of subunits. The method further includes determining a number of valid subunits m to be relocated from the units selected for a batch operation. The selecting is carried out by a unit reclaiming process. The m is at least two.

Another aspect of the present invention provides a non-transitory computer readable article of manufacture tangibly embodying computer readable instructions which, when executed, cause a computer to carry out steps of a method according to the above-mentioned method.

Another aspect of the present invention provides a memory controller for managing a memory. The memory controller includes a processor device configured to select a unit out of a set of units for reclamation by a unit reclaiming process. The memory controller further includes a unit which includes a set of subunits. A processor device configured to determine a number of valid subunits m to be relocated from the selected unit for a batch operation. The m is at least two.

Another aspect of the present invention provides a storage device that includes a memory. The storage device further includes a memory controller for managing the memory. The storage device further includes a set of erasable units by a unit reclaiming process to form a free unit. The unit includes a set of subunits. The data updates are performed by writing data updates to the subunits so that the updated data is written to a subunit that is different from the subunit that contained the outdated data. The subunit that contains the outdated data is an invalid subunit. The subunit containing the updated data is a valid subunit.

BRIEF DESCRIPTION OF THE DRAWINGS

The present invention and its embodiments will be fully appreciated by referring to the following detailed description of the preferred but nonetheless illustrative embodiments of the present invention when taken in conjunction with the accompanying Figures.

DETAILED DESCRIPTION OF THE PREFERRED EMBODIMENTS

Figure 1:
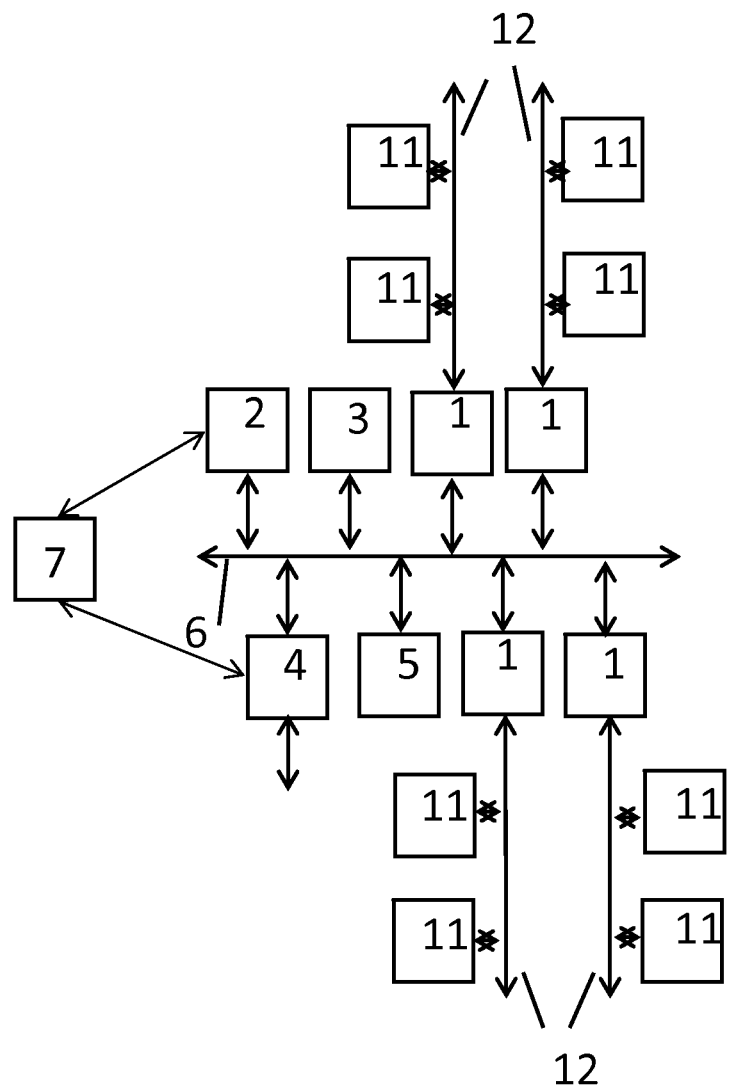
FIG. 1 is a block diagram illustrating a storage device according to an embodiment of the present invention.

As an introduction to the following description, the general aspect of the present invention is explained. This concerns a memory controller as well as a method for managing a computerized memory. The memory includes a set of units for storing data where a unit of the set of units is erasable as a whole by a unit reclaiming process resulting in a free unit available for writing data to.

Flash memory represents that type of solid state memory device, and more specifically is a non-volatile solid-state memory technology that can be electrically programmed, erased, and reprogrammed. Its low power consumption and good shock resistance have made it very popular for portable devices, such as digital cameras, portable music players, mobile phones, and handheld computers. The computer industry has started to use flash technology in so-called solid-state drives ("SSDs") as hard-disk replacement in workstations and even enterprise systems. Solid-state drives are built around multiple dies which are used to store and retrieve user data. A die includes a number of units also known as blocks in the flash technology context. A unit contains a number of subunits also known as pages in the flash technology context. A die represents a physical entity preferably which includes a semi-conducting substrate. One or more dies are typically assembled into a single chip. A certain number of dies together with a channel controller and a bus interconnecting the dies with the channel controller form a subsystem called channel. An SSD—or more generally denoted as a memory device—can contain several channels which operate in parallel.

Further, building blocks of the memory device include a central processor, random-access memory, host interface(s), DMA controllers, and a central bus or other interconnect mechanism to provide connectivity among the various channels. The channel controller handles requests to its associate set of dies and builds the associate channel. Channel controllers operate independent from each other and preferably fetch new requests from a special location in an SDRAM. For example, represented by one or more circular buffers, and perform a command corresponding to the request in the buffer on a target die including a data transfer if applicable. A single channel controller can operate on multiple dies and therefore different dies might perform different commands concurrently. On the other hand, a die typically supports one read, write or erase operation being processed concurrently. Newer dies allow two concurrent operations although with certain limitations, for example the operations shall be the same type of operation, there can be restrictions on the exact location in the die, and etc. Therefore, many operations can be outstanding on a single channel. However, the channel controller operations can only be handled one by one. Therefore, read, write, and erase operations are typically handled asynchronously.

In flash-based systems, a writing mechanism called "out-of-place writing" is applied. When a page or a fraction of a page should be rewritten, the new or updated data can not overwrite the memory location, for example, one or more pages, where the data is currently stored. Instead, the new data is written to another page and the old page is marked invalid. Over time, the SSD accumulates invalid pages and the number of free pages decreases. To make space for new or updated data, invalid pages are preferably reclaimed. The only way to reclaim a page is to erase the entire block the page pertains to. Reclamation also known as garbage collection, is processed in multiple steps. First, one or more of the blocks is selected for reclamation. Second, valid pages of these blocks are copied and relocated to a free block which then becomes part of the devices actively used as storage space. An invalidation of such relocated pages can be done implicitly by changing a mapping table only or explicitly by maintaining a validity status of pages. Third, the reclaimed block is erased, becomes a free block, joins a free-block pool and becomes available for writing new data to.

Specifically, a memory controller such as a channel controller, can select a unit out of the units pertaining to the same channel when the channel controller acts on for reclamation, and a number n of valid subunits contained in the selected unit is determined and a number m of subunits to be relocated in a batch operation with batch size of m>1 is determined. Batch operations are applied to a batch of valid subunits the data which are selected to be relocated, and reduces a processing time for relocation within a unit reclaiming process as explained in further detail below.

Preferably, a total number n of valid subunits contained in the selected unit is identified. The total number n of valid subunits can continuously be tracked or can be determined after or just before the subject unit is selected for unit reclaiming purposes. The number of m valid subunits to be relocated in a batch operation is at least two. Of course, the number m is limited by the total number n of valid subunits to be relocated. In order to relocate n subunits there are m units relocated in a batch operation multiple times in case n>=2 m. A last batch of subunits might hold less than m subunits. The number m of valid subunits to be relocated in a batch operation can in one embodiment depend on the total number of valid subunits in the unit to be reclaimed.

The number n of valid subunits to be relocated in a batch operation is determined dependent on one or more of: a total number n of valid subunits contained in the selected unit; a number of free units currently available; one or more system parameters including but not limited to a parameter characterizing a read operation, a parameter characterizing a write operation, a parameter characterizing an erase operation, a parameter characterizing a queue used for placing relocation requests for relocating the valid subunits. Also a number n of valid subunits contained in the selected unit is determined, and the n units are relocated by operating relocation requests for the n subunits in one or more batches of size m for all but the last batch which might hold less than m subunits.

In a further embodiment of the present invention, the more valid subunits that are found in total in a unit, the faster the unit reclaiming process is desired to be performed. For example, the higher the number m of valid subunits to be relocated in a batch operation is determined. In other words, the relocation batch size is increasing with an increasing total number of valid subunits in the selected unit.

In the flash context, a speed of the garbage collection process can be controlled by adjusting the number of page relocations processed in parallel as a function of the number of valid pages in the block being garbage collected. The batch size which corresponds to the exact number of pages that shall be relocated in parallel can as a result be a function of the total number of valid pages in the garbage-collected block. Further it can depend on read, write, and, erase latencies as well as queuing delays in the one or more queues, such as circular buffers, used for queuing the relocation requests. These values are either known a priori and can be specified in a data sheet of a flash memory device or as a specification of the data bus transfer speed. An upper bound of such values can be estimated from a sizing of the circular buffers and/or queues. In many instances, the batch size m can typically be significantly lower than the total number of valid pages n in a block, for example it can be less than 10 percent of the total number of valid pages of that block. This can be true even if the total number of valid pages in the block to be relocated is rather high. This is beneficial in order to reduce latency of user requests, such as requests from the outside of the memory such as from a host.

In a further embodiment of the present invention the batch size can be determined depending on the number of subunits to be relocated in combination with a number of free units available. For example, this determination can be used to smooth the number of relocation requests executed in parallel and/or gradually increase the batch size when the number of free units still decreases or is very low.

Applying a batch operation to the determined number n of valid subunits preferably is represented by operating relocation requests for m subunits in a batch. Prior to such batch operation, the (first) m subunits to be relocated can actually be determined out of the total number of valid subunits. Specifically, each relocation request can include a read request for reading data from the subunit to be relocated. Preferably, the m read requests for the m subunits to be relocated are queued in a row for execution without another request in between the m read requests. These read requests can be queued in a queue of the RAM. Typically, each relocation request includes a write request following the read request for writing the data read from the subunit to be relocated to its destination. The write request typically can only be executed after the read request has terminated by providing the read data.

In conventional systems relocation requests are queued in a queue one-by-one, which includes first posting a read request of the relocation request, waiting for the data read including allowing other requests to join the queue during this waiting period, and as soon as the read request is terminated, posting a write request in the queue for writing the read data to its destination. Such systems also show a waiting time between posting the read request into the queue and its execution for the reason that other requests posted in the queue previous to the read request will be executed first. This idle time accumulates for each and every read request. After all valid subunits have been relocated then the selected unit is erased and added to a set of free units In contrast, the present invention provides a batch of m read requests with m>1 is posted in the queue without allowing any other request to be posted in between, which can simply be implemented by queuing the m read requests in a row into the queue. In the present invention, the above-mentioned waiting time only applies once for the first read request of the batch while the following read requests of the batch neither suffer from the processing time of the current read request or from additional waiting time due to interleaved user requests.

Preferably, the present invention provides a write request following the read request for writing the read data to its destination and is posted into the queue as soon as the read request is terminated, for example, when the data requested are read. It is not necessary to wait for the execution of all read requests of the same batch to be terminated. It is not necessary to wait for the execution of a write request of the same or even a different batch to be terminated for the following reason. Write requests can be executed in parallel. A write request can either be a write request for writing the data read to a subunit of the same channel including the die the subunit is read from, or it can be a write request for writing the data read to a subunit of a channel different to the channel including the die the subunit is read from. Only the first alternative requires processing time at the present channel controller orchestrating the relocation while the second alternative only includes a transfer of the data to a sibling channel controller while the data is written there and processing time accumulates at the sibling channel controller. This is the reason the batch processing in the present invention is characterized to be a parallel process since write requests can be processed in parallel when being executed on different channels although the initiating read requests are posted in a row into the queue and are executed serially. This is substantiated by the fact that write operations typically take one order of magnitude more time to complete than read operations. Therefore, the number of outstanding relocation requests can be controlled by sending commands in batches and waiting until an entire batch completes, where such batch can partially be executed in parallel.

In a further embodiment of the present invention, a channel controller can contain two queues for queuing requests waiting in the queues to be executed. Such queues can be denoted as a high priority queue and a normal priority queue per die for transmitting commands to the hardware. Scheduling of requests can be influenced by placing requests adequately into one of these two queues, which preferably are implemented as two circular buffers, while at the same time controlling the number of outstanding requests in the high priority queue by means of batch processing. In a further embodiment, the unit reclaiming requests are placed in the high priority queue, for example the first queue, and user requests are placed in the low priority queue, the second queue. User requests can represent user read and write requests, originating, for example, from a host connected to a storage system including the solid state memory device. The priority in this embodiment can be understood in that the scheduler serves requests from the high priority queue whenever a request is available there. Only if the high priority queue is empty requests from the low priority queue will be served by the scheduler. Therefore, in such a strategy which can properly prevent from deadlock situations due to non-availability of free subunits for write requests the unit reclaiming requests are treated with higher priority than user requests. In a further embodiment of the present invention, a unit reclaiming request can only be placed in the high priority queue if the number of free units available falls and/or is below a first threshold.

In a further embodiment of the present invention a first queue and a second queue for holding requests to be executed, and a scheduler for selecting requests that are waiting in the first queue and the second queue for execution which scheduler is adapted to prioritize requests waiting in the first queue over requests waiting in the second queue. The controller is adapted to queue unit reclaiming requests in the first queue, and wherein the controller is adapted to queue user requests in the second queue. The controller is adapted to queue unit reclaiming request in the second queue in case a number of free units available is between a first threshold (T1) and a second threshold (T2), which second threshold (T2) is below the first threshold (T1). The controller is adapted to queue unit reclaiming requests in the first queue in case the number of free units is below the second threshold.

The present invention targets at balancing a user write rate and a unit reclaiming rate in a simple way at the cost of slightly longer request latencies. Due to its simplicity, no hardware changes are required. The concept can fully be implemented in (flash) controller firmware. As a side effect, the average number of free blocks in the system can be smaller, which helps to reduce write amplification because all valid data is spread over more flash blocks which reduces the average number of valid pages in blocks, and the average number of relocations. Another advantage is that the decision of how many pages are concurrently relocated is done prior to putting these garbage-collection requests into the circular buffers. The scheduling of user requests and garbage collection requests is implicitly controlled and does not require transferring scheduling information from firmware to the channel controllers, and therefore no modification of hardware or hardware microcode is needed.

In the figures, same or similar elements are denoted by the same reference signs.

FIG. 1 illustrates a block diagram of a storage device according to an embodiment of the present invention. The storage device includes a memory device built in NAND flash memory technology. The storage device includes multiple flash dies 11 which are used to store and retrieve user data. A certain number of flash dies 11, together with a channel controller 1 and a bus 12 interconnecting the flash dies 11 and the channel controller 1, form a subsystem called flash channel. A storage device in form of a solid state drive (SSD) can contain several flash channels which work in parallel. Further, building blocks are the central processor 2, random-access memory (RAM) 3, host interface(s) 4, DMA controllers 5, a mailbox 7 and a central bus 6 or other interconnecting mechanisms to provide high-speed connectivity among the various subsystems. The host interface 4 connects the SSD to the outside world from where user read and write requests are issued. On the other side, the host interface 4 is connected to the central bus 6 or crossbar. The central processor 2, for example embodied as an embedded microprocessor in the SSD controller, dispatches host requests to the appropriate channel controllers 1. It also performs all management functions (e.g., mapping from logical to physical addresses, garbage collection, and wear leveling . . . ). The RAM 3 is used to buffer data being transferred from the host to the memory device and vice versa. It also maintains meta-data structures needed for the management functions. The mailbox 7 is used to queue new requests to be processed coming through the host interface to the central processor. Vice versa the embedded microprocessor uses the mailbox to indicate the completion of requests to the host interface 4. The channel controller 1 handles requests to the set of dies 11 building the respective channel. The channel controllers 1 operate independent from each other and fetch new requests from a special location in the RAM 3, which special location is embodied as circular buffer, and perform the corresponding commands on the target die including any data transfer where needed. A single channel controller 1 can operate on multiple dies 11 hence different dies 11 might perform different commands concurrently.

NAND Flash chips typically support one read, write, or erase operation being processed concurrently. Newer chips allow two concurrent operations with additional limitations (e.g., in the same operation, restriction on the exact location in the die, etc.). Many operations can be outstanding on a single channel. However, the channel controller 1 can only handle operations one by one. Therefore, read, write, and erase operations must be handled asynchronously. To achieve high throughput, on one side enough operations are preferably queued for a single die until the channel controller 1 reserves that die again, and on the other side completed operations by the hardware preferably be queued until the channel controller 1 has time to pick them up.

Figure 2:
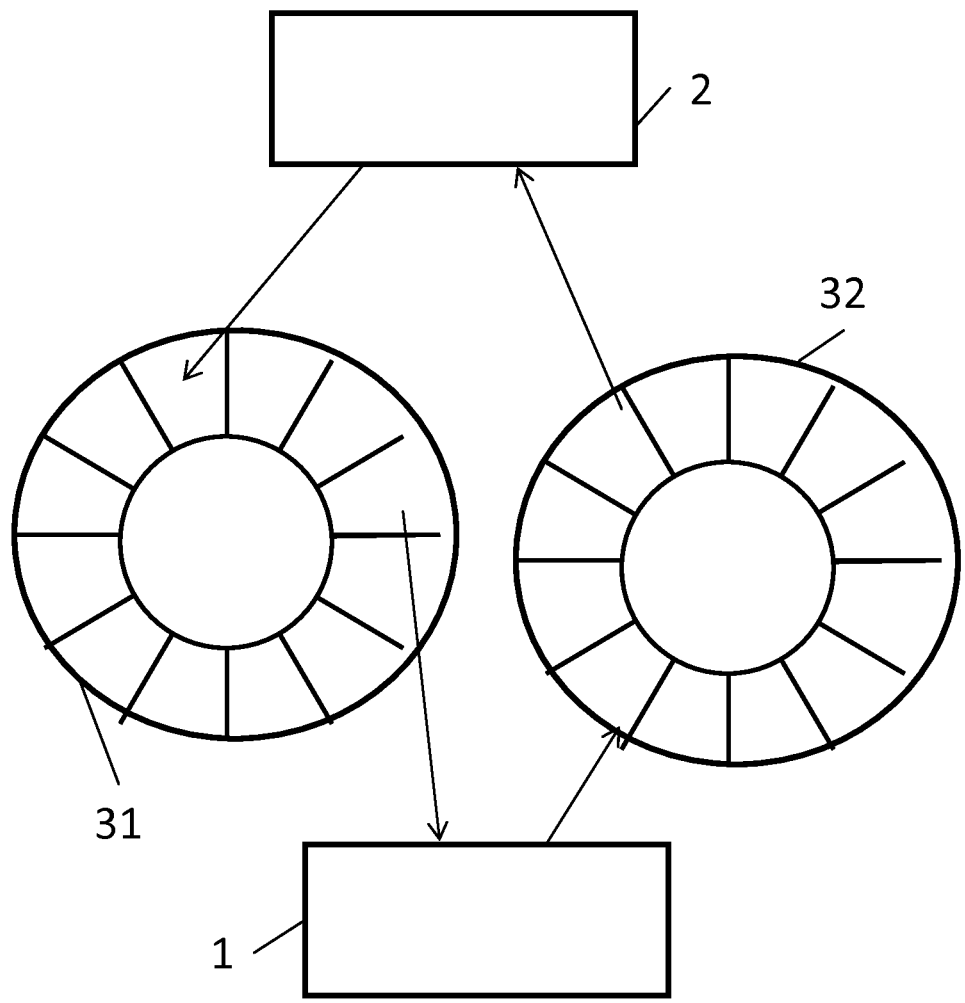
FIG. 2 is a block diagram of a buffer structure as used in the context of a further embodiment of the present invention.

This is typically implemented using a circular buffer data structure as shown in FIG. 2. A circular buffer uses a single fixed-sized buffer for transferring operations from a producer to a consumer. It automatically wraps to the first location in the buffer once the last one has been used. Separate circular buffers, are used to send operations to the hardware such as circular buffer 31 by the channel controller 1 and to receive completion information back from the hardware such as circular buffer 32 by the channel controller 1. The hardware in this context is represented by the central processor 2. It is important to note that once a producer places an operation in the circular buffer, it can no longer be altered.

A NAND flash memory die is partitioned into units also known as blocks, where each block has a fixed number of subunits also known as pages. Typically, a block can contain one of 64, 128 and 256 pages, where each page can be a fixed size such as 4 or 8 Kbytes. In typical flash dies, data is written in an entity of one page, and an erase operation is performed on an entity of one block. Read requests are typically performed in entities of pages. A page can either be programmable or un-programmable. A programmable page becomes un-programmable once it is written in which it contains either valid or invalid data.

In a further embodiment of the present invention the memory controller is a channel controller for controlling operation on a channel having multiple dies of the memory connected by a bus wherein a die includes multiple units. The memory controller is adapted to write data read from a subunit to be relocated to a subunit preferably in a different unit of the same channel including the die the subunit is read from or to write data read to a subunit to be relocated to a subunit of a channel different to the channel including the die the subunit is read from.

Figure 3:
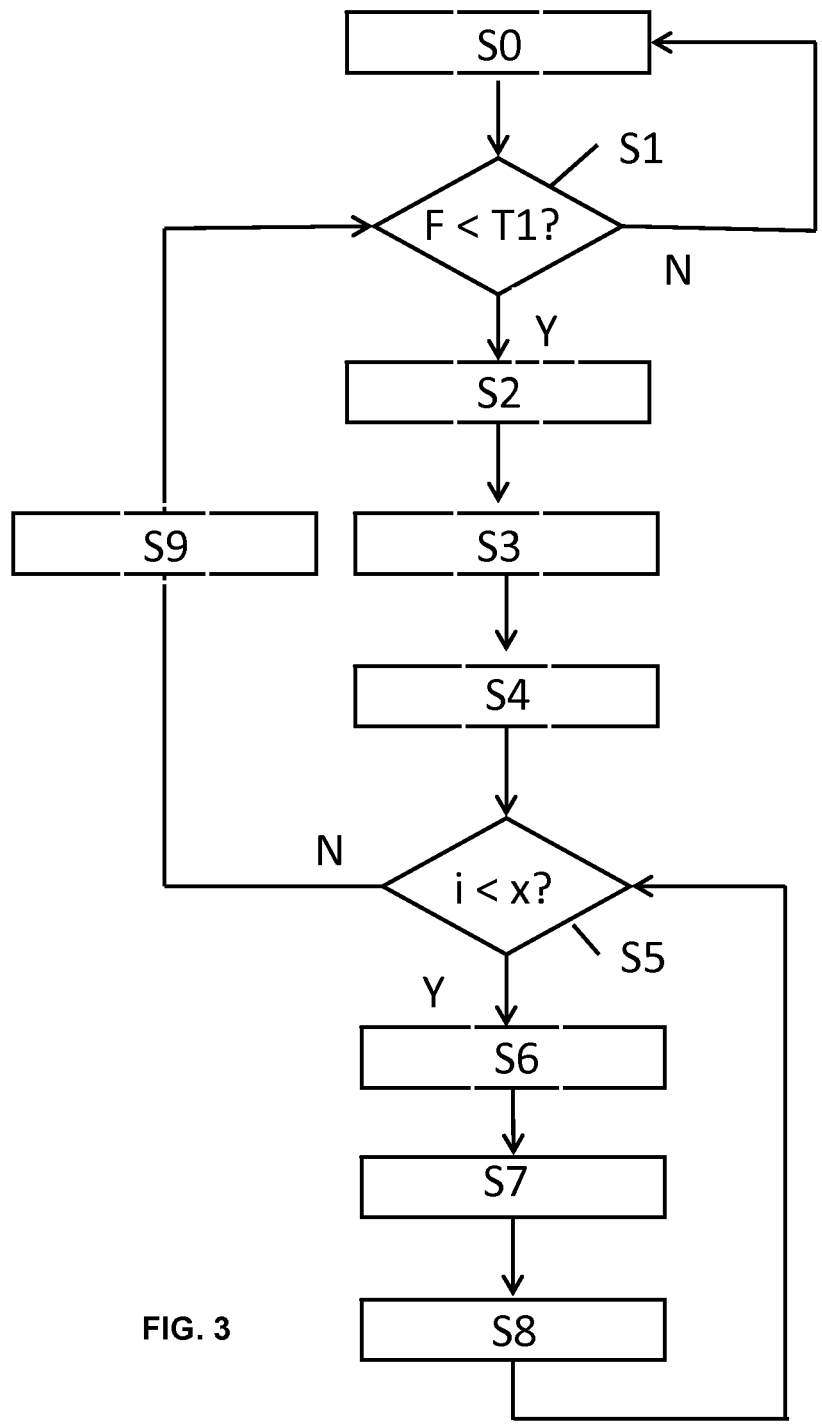
FIG. 3 is a flow chart of a method according to a further embodiment of the present invention.

FIG. 3 illustrates a flow chart of a method according to an embodiment of the present invention. In step S0, the process is started. In step S1 it is verified, if a number of free units F is below a given threshold T1. Initially, when F>T1 and sufficient free blocks are around, which is a typical scenario when a new die starts operation, user read and write requests are assigned an equal or higher priority than valid-page relocations and block erases. In order to save processing and storage resources, the first threshold T1 can preferably be kept as small as possible in comparison to the total number of units in a die which can be on the order of tens of thousands. On the other hand, it is advantageous in both embodiments, if during a temporary high load there is a sufficiently large buffer of free units available to bridge the time until the system catches up with the freeing-up of units. Analysis and simulation suggests that for today's 128 or 256 pages per block, a first threshold value of T1 in the range of 40 to 80 is adequate. Using a simple counter, the system keeps track of the number of free blocks F. The counter is decreased by 1, when the free page allocator takes a new block from the free block pool after a block has been selected to allocate pages from for writing to and is increased by 1 after a block has been erased. If the number of free blocks F is equal to or larger than a first threshold T1, no block reclaiming process is performed. If the number of free blocks F changes from being larger than T1 to T1 or smaller than T1, a command for block reclaiming will be issued and the corresponding unit reclaiming requests will be queued in the first queue. Upon completion of the block reclaiming process, which includes the subsequent updating of the free-blocks counter, the system immediately triggers a new block reclaiming command, if the number of free blocks F still is smaller than T1.

If so (Y), then block reclamation is triggered and in step S2 a unit to be reclaimed is selected according to any criteria that is applied. In step S3, a total number of valid subunits in the selected unit is identified which finally are the valid subunits that are preferably relocated prior to an erasure of the selected unit. In one example, original LBA information (Logical Block Address) of all data subunits in the selected unit can be used to perform a logical-to-physical address lookup. If a result of the address lookup still points to the same physical location in the unit being reclaimed, the subject subunit is still valid and preferably will be relocated. Based on the total number of subunits to be relocated, it is determined in step S4 how many of the valid subunits are relocated in parallel, for example, the batch size m is determined and a number m of subunits to be relocated in a batch operation is determined. Pages relocated in parallel are called a batch. A number of batches x to be executed is determined by dividing the total number of valid units n plus the batch size minus one by the batch size m, namely, $x=(n+m-1)/m$. A batch counter i is set to zero. In step S5 it is verified if the value i of the batch counter is still below x. If so (Y), a read request is issued for all m subunits in the batch in step S6. Note that the last batch might hold less than m requests. In step S7, a new write location is determined for every completed subunit read, and a write operation is issued to the new location. In step S8 it is waited until all subunits of the respective batch have been relocated to new subunits before processing the next batch i+1. If all batches have been processed, for example, i=x−1, the selected unit is scheduled for erasure in step S9. In step S1 it is verified again if there are still enough free blocks in the system. If there are (N) block reclaiming is suspended.

The batch size m which corresponds to the exact number of m valid pages that are relocated in parallel out of the n valid pages in the block preferably is a function of the total number of valid pages in the selected unit and the number of F free units currently available.

In a further embodiment of the present invention, a second threshold is introduced which is lower than the first threshold T1. If the number F of free blocks is between the first threshold T1 and the second threshold T2, pages are relocated one-by-one in order to minimize a latency of user requests. As described above, only when the number of free blocks falls below the second threshold, relocations are done in batches with variable batch sizes>1. This regime (batch size>1) is maintained until the number of free blocks is again higher than the first threshold. Also in a further embodiment of the present invention where the garbage collection is suspended In a further embodiment of the present invention relocation requests are queued in the second queue together with user requests when the number of F free blocks is between the first threshold T1 and the second threshold T2, and relocation requests are queued in the first queue when the number of F free blocks falls below the second threshold. When the number of F free blocks is between the first threshold T1 and the second threshold T2, the relocation requests could also be queued in batches.

The unit is selected for reclamation if a number of free units is below a first threshold. The determined number n of valid subunits from the unit selected for reclamation is relocated in batch operations of m subunits for all but the last batch which might hold less than m subunits if the number of free units is below a second threshold which second threshold is lower than the first threshold, and valid subunits from the unit selected for reclamation are relocated one by one without applying a batch operation if the number of free units is below the first threshold and above or equal to the second threshold.

Aspects of the present invention can be embodied as a system, method or computer program product. Accordingly, aspects of the present invention, in particular in form of the controller, can take the form of an entirely hardware embodiment, an entirely software embodiment (including firmware, resident software, micro-code, etc.) or an embodiment combining software and hardware aspects that can all generally be referred to herein as a "circuit," "module" or "system."

Furthermore, aspects of the present invention, such as the read and write methods, can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In further embodiment of the present invention, the storage device can include multiple channels. A channel includes multiple dies connected via a bus to a memory controller according to any one of the previous embodiments.

Aspects of the present invention are described above with reference to flowchart illustrations and/or block Figures of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s).

It should also be noted that, in some alternative implementations, the functions noted in the block can occur out of the order than as noted in the Figures. For example, two blocks shown in succession can, in fact, be executed substantially concurrently, or the blocks can sometimes be executed in the reverse order, depending upon the functionality involved. It can also be that each block of the block diagrams and/or flowchart illustration and combinations of blocks in the block diagrams and/or flowchart illustration can be implemented by special purpose hardware-based systems that perform the specified functions or acts, or combinations of special purpose hardware and computer instructions.

What is claimed is:

1. A method of managing a memory which includes a set of units, the method comprising:
   selecting at least one unit from a set of units in a solid state memory device, where each of the set of units is a fixed size solid state memory block, where each of the set of units is configured to store data and is erasable as a whole by a unit reclaiming process, and where each of the set of units comprises a plurality of subunits, where each of the plurality of subunits is a solid state memory page that is of a fixed size;
   identifying a set of valid subunits n within the at least one selected unit;
   determining a number m of valid subunits within each of the set of valid subunits n to be relocated by a batch operation from the at least one unit that has been selected, wherein the selecting is carried out by a unit reclaiming process, and wherein m is at least two; and
   performing the batch operation, the batch operation relocating each of the set of valid subunits n by operating relocation requests for each of the set of valid subunits in batches of size m in which the last batch to be relocated is not required to be equal to m subunits, wherein operating relocation requests further comprises:
   storing each of a plurality of read requests for the m subunits to be relocated in a queue configured to store at least user requests and read requests for relocation requests associated with subunits, each of the plurality of read requests being stored in a row for execution and are included within one of a plurality of relocation requests, wherein the queuing prevents another request from posting in between the m read requests.

2. The method of claim 1, further comprising:
   writing data updates to outdated data;
   wherein the data updates are written to the subunits so that the updated data is written to a different subunit from the subunit that comprises the outdated data; and
   wherein the subunit that comprises the outdated data is an invalid subunit and the subunit that comprises the updated data is a valid subunit.

3. The method of claim 1, further comprising:
   determining the number of the valid subunits m to be relocated in the batch operation based on at least one of:
   a total number of valid subunits n comprised in the selected unit;
   a number of free units currently available; and
   at least one system parameter comprising at least one parameter selected from the group consisting of: a read operation, a write operation, an erase operation, and a queue operation for placing relocation requests for relocating the valid subunits m.

4. The method of claim 1, wherein operating relocation requests further comprises:
   writing the data read from the subunit to be relocated according to a write request, wherein the write request is comprised within the relocation request; and
   queuing the write request for execution when the associated read request is terminated, wherein the write request does not wait for the other read requests to be terminated.

5. The method of claim 1, wherein selecting the unit for the reclamation if the number of free units is below a first threshold.

6. The method of claim 5, further comprising:
   relocating a determined number of valid subunits n from the unit selected for reclamation in the batch operation in batches of size m if the number of free units is below a second threshold, wherein the second threshold is lower than the first threshold.

7. The method of claim 5, further comprising:
   relocating a determined number of valid subunits n from the unit selected for reclamation one-by-one, so that the batch operation is not applied, if the number of free units is below the first threshold and above or equal to the second threshold.

8. A non-transitory computer readable article of manufacture tangibly embodying computer readable instructions which, when executed, cause a computer to carry out a method according to claim 1.

9. A memory controller for managing a memory, comprising:
   a processor device configured:
   to select at least one unit out of a set of units in a solid state memory device for reclamation by a unit reclaiming process, where each of the set of units is a fixed size solid state memory block, where each of the set of units is configured to store data and is erasable as a whole by the unit reclaiming process, and where each of the set of units comprises a plurality of subunits, where each of the plurality of subunits is a solid state memory page that is of a fixed size;
   to identify a set of valid subunits n within the at least one selected unit;
   to determine a number m of valid subunits within each of the set of valid subunits n to be relocated by a batch operation from the at least one unit that has been selected, wherein m is at least two;
   to select a batch size for the batch operation based on the number m of valid subunits to be relocated in combination with a number of free units available, wherein the batch size corresponds to a number of subunits to be relocated in parallel during the batch operation; and
   to perform the batch operation, the batch operation relocating each of the set of valid subunits n by operating relocation requests for each of the set of valid subunits in batches of size m in which the last batch to be relocated is not required to be equal to m subunits, wherein operating relocation requests further comprises:

storing each of a plurality of read requests for the m subunits to be relocated in a queue configured to store at least user requests and read requests for relocation requests associated with subunits, each of the plurality of read requests being stored in a row for execution and are included within one of a plurality of relocation requests, wherein the queuing prevents another request from posting in between the m read requests;

performing a plurality of read operations, where each of the plurality of read operations reads data from the subunit to be relocated according to one of the plurality of read requests; and performing a plurality of write operations each corresponding to one of the plurality of read operations, where each of plurality of write operations writes the data read by the corresponding read operation to a new subunit, and where at least two of the plurality of write operations are performed in parallel.

10. The memory controller of claim 9, wherein the memory controller is a channel controller, comprising:
a memory having multiple dies; and
a bus which connects the multiple dies;
wherein a die comprises multiple units.

11. The memory controller of claim 10, wherein the memory controller is adapted to write data that has been read from the subunit to be relocated to a subunit of the same channel wherein the channel includes a same die as the die which the subunit is read from.

12. The memory controller of claim 10, wherein the memory controller is adapted to write data that has been read to the subunit to be relocated to a subunit of a different channel wherein the channel that includes a different die from a die that the subunit is read from.

13. The memory controller of claim 9, further comprising:
a first queue and a second queue, wherein the first queue and the second queue are adapted to hold requests to be executed; and
a scheduler for selecting requests that are waiting in the first queue and the second queue for execution, wherein the scheduler is adapted to prioritize the requests that are waiting in the first queue over the requests waiting in the second queue;
wherein the first queue is adapted to queue unit reclaiming requests; and
wherein the second queue is adapted to queue user requests.

14. The memory controller of claim 9, comprising:
a first queue and a second queue, wherein the first queue and the second queue are adapted to hold requests to be executed; and
a scheduler for selecting requests that are waiting in the first queue and the second queue for execution according to a first and a second threshold, wherein the second threshold is below the first threshold;
wherein the memory controller is adapted to queue:
unit reclaiming requests in the second queue if a number of free units available is between the first threshold and the second threshold; and
unit reclaiming requests in the first queue if the number of free units is below the second threshold.

15. A storage device, comprising:
a solid state memory;
a memory controller for managing the solid state memory;
a set of erasable units erasable by a unit reclaiming process to form a free unit, where each of the set of units is a fixed size solid state memory block, where each of the set of units is configured to store data, and where each of the set of units comprises a plurality of subunits, where each of the plurality of subunits is a solid state memory page that is of a fixed size,
wherein data updates are performed by writing data updates to each of the subunits so that the updated data is written to a subunit that is different from the subunit that comprised the outdated data,
wherein the subunit that comprises the outdated data is an invalid subunit, and
wherein the subunit comprising the updated data is a valid subunit,
wherein the memory controller is configured to
select at least one unit from the set of units;
identify a total number of valid subunits n within the at least one selected unit;
determine a number m of valid subunits within each of the set of valid subunits n to be relocated by a set of batch operations from the at least one unit that has been selected, wherein the selecting is carried out by a unit reclaiming process, and wherein m is at least two;
selecting a batch size for the set of batch operations based on the number m of valid subunits to be relocated in combination with a number of free units available, wherein the batch size corresponds to a number of subunits to be relocated in parallel during the batch operation;
determining a number of batches to be executed for the set of batch operations based on dividing the total number of valid subunits n plus the batch size minus one by the batch size; and
perform the set of batch operations, the set of batch operations relocating each of the set of valid subunits n by operating relocation requests for each of the set of valid subunits in batches of the selected batch size in which the last batch to be relocated is not required to be equal to m subunits, wherein operating relocation requests further comprises:
storing each of a plurality of read requests for the m subunits to be relocated in a queue configured to store at least user requests and read requests for relocation requests associated with subunits, each of the plurality of read requests being stored in a row for execution and are included within one of a plurality of relocation requests, wherein the queuing prevents another request from posting in between the m read requests.

16. The storage device according to claim 15, further comprising:
multiple channels having multiple dies; and
a bus that connects the memory controller to the multiple dies.

* * * * *